United States Patent [19]

Förner et al.

[11] Patent Number: 4,577,795
[45] Date of Patent: Mar. 25, 1986

[54] DEVICE FOR OVERLAY-WELDING PIPES BENDS

[75] Inventors: Siegfried Förner, Erlangen; Karl-Heinz Langhammer, Berlin; Dieter Pellkofer, Herzogenaurach; Wolfgang Nahr, Erlangen, all of Fed. Rep. of Germany

[73] Assignee: Kraftwerk Union Aktiengesellschaft, Mülheim, Fed. Rep. of Germany

[21] Appl. No.: 685,299

[22] Filed: Dec. 24, 1984

[30] Foreign Application Priority Data

Dec. 28, 1983 [DE] Fed. Rep. of Germany ....... 3347319

[51] Int. Cl.$^4$ .......................... B23K 5/18; B23K 9/04; B23K 31/02; B23K 37/04
[52] U.S. Cl. .......................................... 228/29; 228/48
[58] Field of Search .................. 228/29, 45, 47, 48, 228/49.2; 269/41, 43, 48.1, 55, 56, 57, 63; 219/60 A

[56] References Cited

U.S. PATENT DOCUMENTS 3,239,209  3/1966  Kucka .................... 228/48
4,215,809  8/1980  Davis ..................... 228/48

FOREIGN PATENT DOCUMENTS 2806959  6/1979  Fed. Rep. of Germany ........ 228/48
969494  11/1982  U.S.S.R. ................. 228/47

OTHER PUBLICATIONS

Kraftwer Union AG Publication, "Intern", 5/83 (Oct.) Edition.

Primary Examiner—Nicholas P. Godici
Assistant Examiner—M. Jordan
Attorney, Agent, or Firm—Herbert L. Lerner; Laurence A. Greenberg

[57] ABSTRACT

A device for overlay-welding a pipe interior having an arm extensible into the interior of a respective pipe, the arm carrying a welding head at a free end thereof includes a rotating device in the form of a wheel surrounding and supporting the pipe, and a swiveling device disposed in the wheel for moving the pipe in a circular arc about the center of the wheel and transversely to the plane of the wheel, the arm being curved and being secured to a part of the swiveling device connected to the wheel, the welding head being rotatable in the plane of the wheel for overlay-welding pipes formed at least partly with a bend therein.

10 Claims, 2 Drawing Figures

DEVICE FOR OVERLAY-WELDING PIPES BENDS

The invention relates to a device for the overlay welding of the inside of pipes with an arm or jib which extends into the pipe and supports a welding head at its feed end, and with a rotating device carrying the pipe.

In the magazine for the employees of Kraftwerk Union Aktiengesellschaft, "Intern", 5/83 (October) Edition, a device of the type mentioned hereinbefore is described on pages 10 and 11, with which straight pipe sections up to 8 m long can be overlay-welded. The weld plating is applied thereat helically by simultaneous rotation of the pipe section about its longitudinal axis and translatory relative motion in direction of the pipe axis; as starting material, strips are used thereat which are applied with a thickness of 0.5 mm and a width of 50 mm. For a pipe 7 m long, 140 layers are weldedin adjacent to one another without gaps. The rotating device is essentially a support engaging the underside of the pipe with roller pairs, the rollers of which are arranged opposite one another with a spacing smaller than the tube diameter.

SUMMARY OF THE INVENTION

It is an object of the invention to provide a device for the overlay-welding of pipe bends i.e. of curved pipe sections With the foregoing and other objects in view, there is provided, in accordance with the invention, a device for overlay-welding a pipe interior having an arm extensible into the interior of a respective pipe, the arm carrying a welding head at a free end thereof, comprising a rotating device in the form of a wheel surrounding and supporting the pipe, and swiveling means disposed in the wheel for moving the pipe in a circular arc about the center of the wheel and transversely to the plane of the wheel, the arm being curved and being secured to a part of the swiveling means connected to said wheel, the welding head being rotatable in the plane of the wheel for overlay-welding pipes formed at least partly with a bend therein.

With the new device according to the invention, three cycles of motion required for overlay welding can be coordinated constructively in a simple manner so that the entire pipe bend can be processed without reclamping. The overlay weld is applied along generatrix or surface lines i.e. on lines parallel to the pipe axis. The same generatrix lines can also be processed and measured with the new device in other ways. In this regard, the swiveling means are reciprocated over 180 , while the wheel can be turned through 360°. Thus, the swiveling means are rotated once about itself for treating a pipe bend. The welding head is moved, so-to-speak in the direction opposite thereto, so that the arc can always burn in the same optimum position.

An exactly reproducible motion of the wheel is achieved, in accordance with another feature of the invention, which includes toothing located at an outer rim of the wheel, and a stationary drive cooperatively connected with the toothing. the teeth can be in engagement, for example, with a chain which transmits the motion from a drive motor to the wheel. However, it is also conceivable, and in accordance with other features of the invention to have the wheel cooperate with a driven gear or as a worm wheel with a spindle.

For fixing the wheel, which must take up all the forces emanating from the pipe elbow, and in accordance with an added feature of the invention, the wheel is formed at one face thereof with a circumferential collar coaxial with the wheel and including a pair of opposing rollers between which the collar is disposed for guiding the wheel.

In accordance with an additional feature of the invention, there is provided another roller disposed at the collar and parallel to the axis of the wheel. The rollers may optionally be under spring pretension so that contact without play is attained. The rollers are preferably equipped with antifriction bearings which make free running possible. In accordance with yet another feature of the invention, the swiveling means comprise a support tube extending in the plane of the wheel through the axis of the wheel, the support tube being mounted in the wheel, and including clamping means for clamping a pipe bend extending through the plane of the wheel.

In accordance with yet a further feature of the invention, the support rod is mounted in the wheel in bearings on both sides of the wheel axis, and the clamping means are seated between the bearings.

In accordance with an alternate feature of the invention, the support tube is supported at one side thereof and carries a chuck for clamping workpieces. Due to this alternate feature, parts can be processed which protrude into the wheel axis. In this sense, there are also understood to be other work pieces, such as the housings of pumps or valves which can be overlay-plated in accordance with the invention without reclamping.

In accordance with a concomitant feature of the invention, there is provided a motor-driven worm disposed in the wheel and wherein the support tube is formed with toothing cooperatively connected with the motor-driven worm. Adjustment of the swiveling device is accordingly provided.

Other features which are considered as characteristic for the invention are set forth in the appended claims.

Although the invention is illustrated and described herein as embodied in a device for overlay-welding pipes, it is nevertheless not intended to be limited to the details shown, since various modifications may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
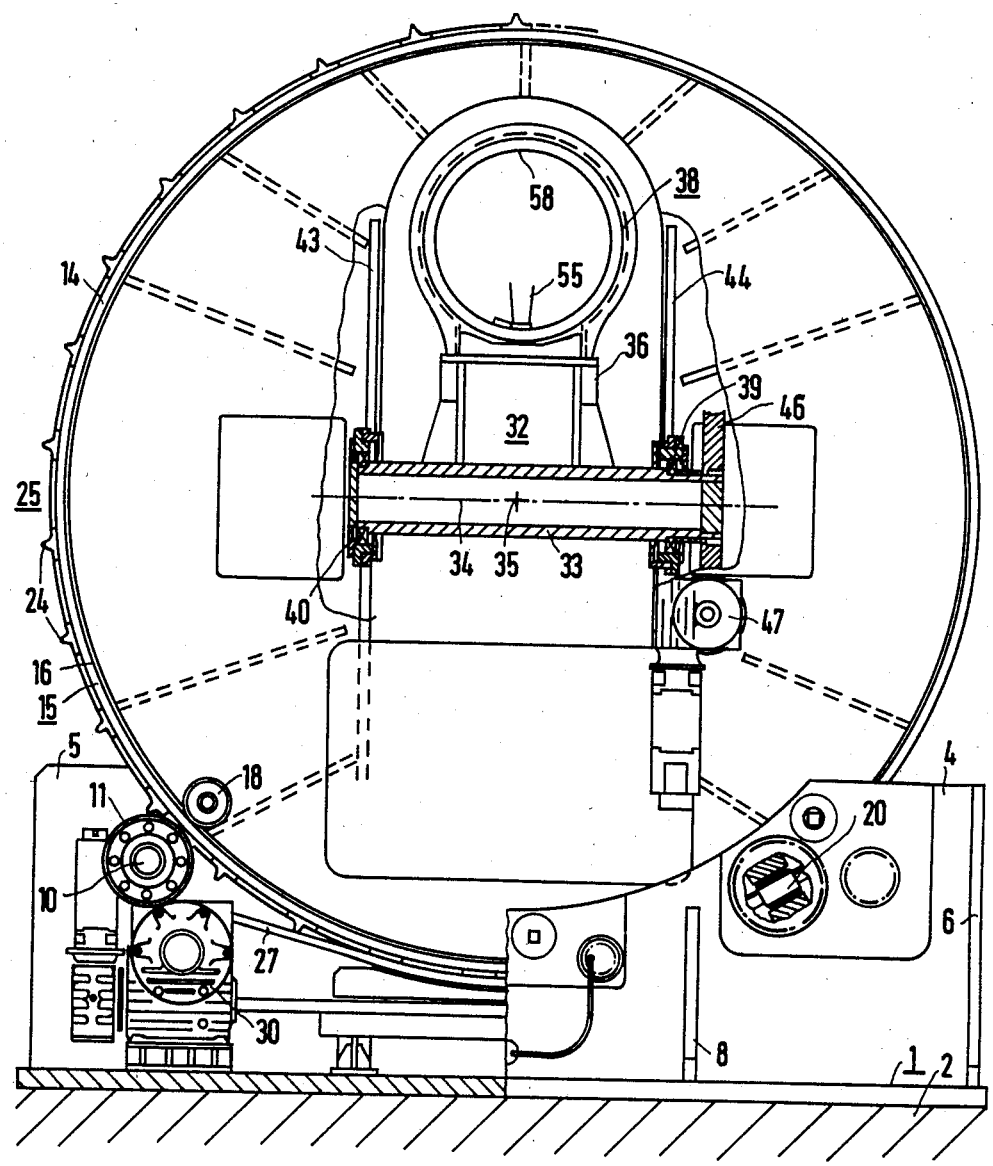
FIG. 1 is a front elevational view, partly in section, of a device for the overlay welding of pipes, according to the invention.

Referring now to the figures of the drawing, there is shown therein a new device according to the invention, which rises above a base plate 1, has approximately the size 3.5×4.5 m and is anchored to the concrete floor 2 of a workshop. Two symmetrical support plates 4 and 5 extend from the base plate 1 and are anchored with struts 6 and 7 to the outer rim of the base plate 1. Additional struts 8 support the central region.

Figure 2:
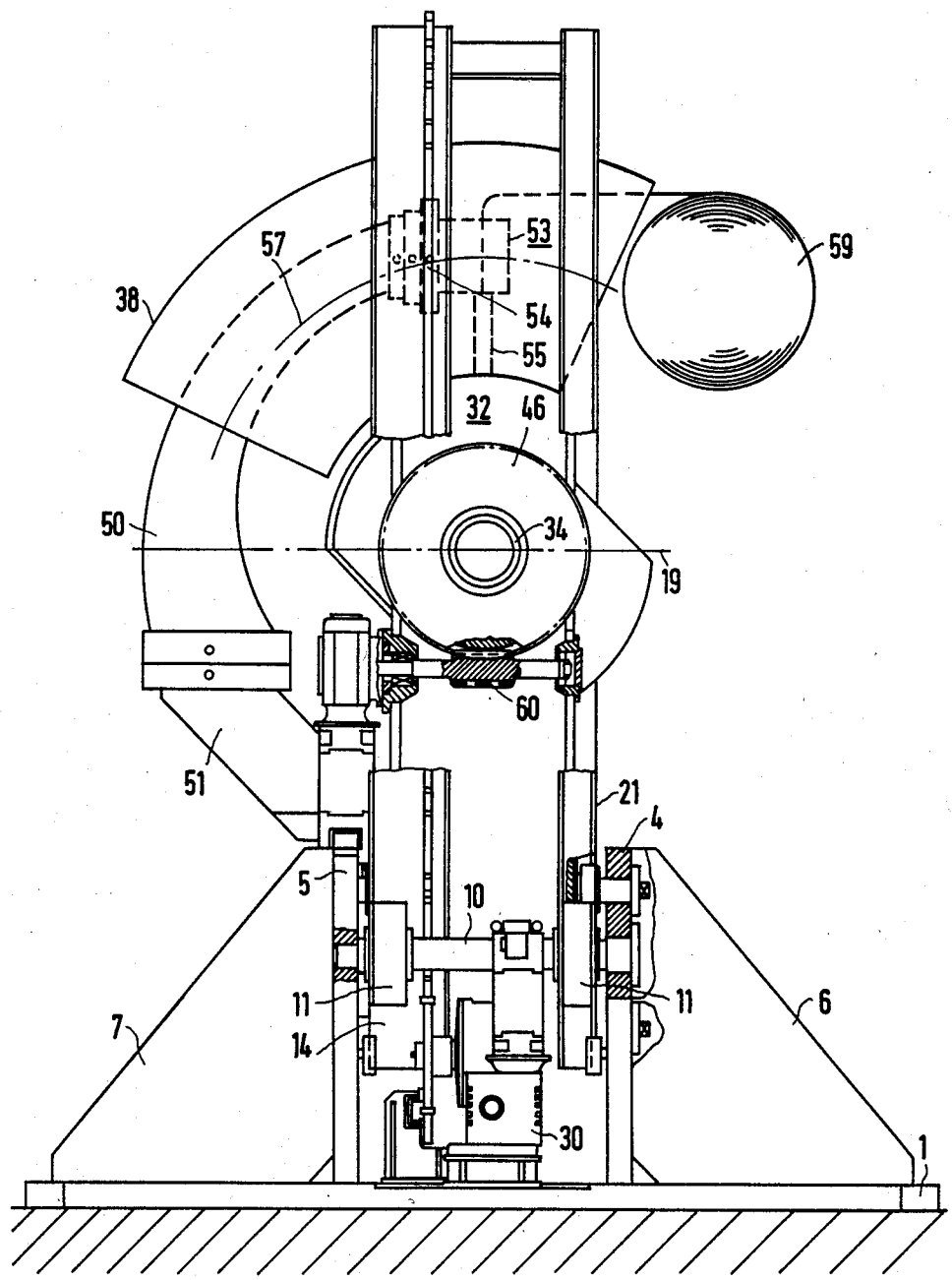
FIG. 2 is a side elevational of view of FIG. 1.

In the support plates 4 and 5 support rollers 11 with common axes 10 are mounted. The support rollers 11 support a laterally projecting collar 14 of a wheel body 15 at its outer rim 16, which has a diameter of 4 m. On the side of the collar 14, guide rollers 18 are provided which are arranged opposite the rollers 11, so that the wheel body 15 is fixed without play in direction of the wheel plane i.e. perpendicularly to the wheel axis 19 shown in phantom. In addition, lateral guidance by means of rollers 20 is provided for holding or retaining the wheel in direction of the wheel axis 19. The rollers 20 act on the outer rim 16 of the wheel body as shown in FIG. 2 at 21.

Thirty identical projections are fastened to the outer rim 16 of the wheel body 15 and are uniformly distributed at an angle of 12° relative to one another. They form a toothing 25 at the circumference of the wheel body 15 and engage in chains 27 gripping the underside of the wheel body 15. The chains 27 are brought by deviating or deflecting rollers, not otherwise shown in detail, to a drive motor which is fastened to the main plate 1. The wheel body 15 can thus be rotated through 360° stepplessly yet adjustably.

Transversely to the axis 19 of the wheel body 15, a support tube 33 is arranged in such a manner that its axis 34, shown in phantom, goes through the center 35 of the wheel body 15. The axis 34 lies in the wheel plane.

The support tube 33 is part of a swivel device 32 which includes a clamping block 36 for a pipe bend 38. The support tube 33 is seated with two ball bearings 39 and 40 in two sheet-metal beams 43 and 44 held in the body of the wheel 15. On the outside of the sheet metal beam 44, the support tube 33 supports a worm wheel 46 which meshes with a worm of a drive motor 47 in such a manner that the support tube 33 with the support block 36 can be swung back and forth through 180°.

A curved arm or jib 50 engages in the pipe elbow 38, has a radius of curvature of 2 m, the same curvature as that of the pipe elbow 38, and extends from a bracket 51. The latter is mounted on the part of the swivel device 32 connected to the wheel 25. The arm or jib 50, a free end thereof protruding into the pipe elbow 38, supports a welding head 53 which can be adjusted in the wheel plane through 360°. The welding head 53 mainly includes a cross feed 54 of orthogonal or perpendicular adjustment of a welding electrode 55. Thereby, a welded joint of sheet-metal strips of austenitic material is formed with the inside 58 of the pipe elbow 38 along generatrix or outer peripheral surface lines of the pipe elbow 38 i.e. in tracks parallel to the axis 57, shown in phantom, which are pulled off a reel 59.

The pipe elbow 38 is moved over the arm or jib 50 which is fixed in the wheel 15 and reciprocates along generatrix lines, which the overlay plating. The reciprocating motion is caused by the motion of the swivel device 32 i.e. by a rotation of the support tube 33 about the longitudinal axis thereof. The rotation being controlled by the worm 60 engaging the worm wheel 46. After each reciprocating pass, care is taken by a rotation of the wheel body 15 that the next layer comes to the lowest point of the pipe 38. At the same time, assurance is provided by a counter rotating adjustment of the welding head 53 that the welding electrode 55 always lies in vertical direction also when welding the adjacent track, so that the optimum layer conditions are maintained for the welding arc and the powder fed to the latter.

The aforementioned setting is effected by a step-wise adjustment of the wheel body 15 by means of the toothing 25 and the chain 27. The pipe elbow 38 is then rotated through a total 360°. The number of individual steps is given by the width of the strips to be welded-in. The adjustment of the welding head 53 can be accomplished in a conventional manner by a rotating mechanism, so that the welding head is likewise rotated through 360° in the last layer of the strip material, but in a sense opposite to the wheel body 15.

The foregoing is a description corresponding in substance to German Application No. P 33 47 319.6, dated Dec. 28, 1983, the International priority of which is being claimed for the instant application, and which is hereby made part of this application. Any material discrepancies between the foregoing specification and the aforementioned corresponding German application are to be resolved in favor of the latter.

We claim:

1. Device for overlay-welding a pipe interior having an arm extensible into the interior of a respective pipe, the arm carrying a welding head at a free end thereof, comprising a rotating device in the form of a wheel surrounding and supporting the pipe, and swiveling means disposed in said wheel for moving the pipe in a circular arc about the center of said wheel and transversely to the plane of said wheel, the arm being curved and being secured to a part of said swiveling means connected to said wheel, said welding head being rotatable in the plane of said wheel for overlaywelding pipes formed at least partly with a bend therein.

2. Device according to claim 1 including toothing located at an outer rim of said wheel, and a stationary drive cooperatively connected with said toothing.

3. Device according to claim 2 including a chain interconnecting said wheel and said stationary drive.

4. Device according to claim 2 including a worm interconnecting said wheel and said stationary drive.

5. Device according to claim 1, wherein said wheel is formed at one face thereof with a circumferential collar coaxial with said wheel and including a pair of opposing rollers between which said collar is disposed for guiding said wheel.

6. Device according to claim 5 including another roller disposed at said collar and parallel to the axis of said wheel.

7. Device according to claim 1 wherein said swiveling means comprise a support tube extending in the plane of said wheel through the axis of said wheel, said support tube being mounted in said wheel, and including clamping means for clamping a pipe bend extending through the plane of said wheel.

8. Device according to claim 7 wherein said support rod is mounted in said wheel in bearings on both sides of the wheel axis, and said clamping means are seated between said bearings.

9. Device according to claim 7 wherein said support tube is supported at one side thereof and carries a chuck for clamping workpieces.

10. Device according to claim 7 including a motor-driven worm disposed in said wheel and wherein said support tube is formed with toothing cooperatively connected with said motor-driven worm.

* * * * *